United States Patent
Pearlman et al.

(10) Patent No.: US 10,003,822 B2
(45) Date of Patent: Jun. 19, 2018

(54) ERROR-RESILIENT CODER OF IMAGE SEQUENCES AND VIDEO

(71) Applicant: PrimaComp, Inc., Niskayuna, NY (US)

(72) Inventors: William A. Pearlman, Niskayuna, NY (US); Yang Hu, Milpitas, CA (US)

(73) Assignee: PrimaComp, Inc., Niskayuna, NY (US)

( * ) Notice: Subject to any disclaimer, the term of this patent is extended or adjusted under 35 U.S.C. 154(b) by 0 days. days.

(21) Appl. No.: 15/040,554

(22) Filed: Feb. 10, 2016

(65) Prior Publication Data

US 2017/0230690 A1    Aug. 10, 2017

(51) Int. Cl.
  *H04B 1/66*    (2006.01)
  *H04N 7/12*    (2006.01)
  *H04N 11/02*    (2006.01)
  *H04N 11/04*    (2006.01)
  *H04N 19/64*    (2014.01)

(52) U.S. Cl.
  CPC .................................. *H04N 19/647* (2014.11)

(58) Field of Classification Search
  USPC .................................................... 375/240.19
  See application file for complete search history.

(56) References Cited

U.S. PATENT DOCUMENTS

| | | | |
|---|---|---|---|
| 5,764,807 A | 6/1998 | Pearlman et al. | |
| 6,674,911 B1 | 1/2004 | Pearlman et al. | |
| 6,873,734 B1 * | 3/2005 | Zandi | G06F 17/148 |
| | | | 375/E7.016 |
| 6,917,711 B1 * | 7/2005 | Wang | H04N 19/647 |
| | | | 375/E7.072 |
| 9,049,432 B1 | 6/2015 | Pearlman | |
| 2004/0028138 A1 | 2/2004 | Piche et al. | |
| 2004/0170335 A1 * | 9/2004 | Pearlman | G06T 9/40 |
| | | | 382/240 |

(Continued)

OTHER PUBLICATIONS

Hu et al. (Y. Hu, W. A. Pearlman and X. Li, "Progressive Significance Map and Its Application to Error-Resilient Image Transmission," in IEEE Transactions on Image Processing, vol. 21, No. 7, pp. 3229-3238, Jul. 2012. doi: 10.1109/TIP.2012.2190084).*

(Continued)

*Primary Examiner* — Behrooz Senfi
*Assistant Examiner* — Ana Picon-Feliciano
(74) *Attorney, Agent, or Firm* — Rachel L. Pearlman, Esq.; Heslin Rothenberg Farley & Mesiti, P.C.

(57) ABSTRACT

A method, computer system, and a computer program product is disclosed for encoding a sequence of frames as one or more compressed bitstreams, the method includes a processor obtaining a sequence of frames in an order and performing a wavelet transform on each frame of the sequence of frames independently in the order. The processor constructs a significant points list and an insignificant sets list, creating one or more spatial trees comprised of branch nodes of the list of insignificant sets for each frame of the sequence of frames. The processor initializes the significant points list and the list of insignificant sets for each frame and identifies a most significant bit in each frame and for each frame, selects at least one coding unit and creates a progressive significance map for coding. The processor writes a global header and a local header for the compressed bitstreams for each coding unit.

13 Claims, 6 Drawing Sheets

(56) References Cited

U.S. PATENT DOCUMENTS

| | | |
|---|---|---|
| 2008/0031344 A1 | 2/2008 | Lu et al. |
| 2008/0266151 A1 | 10/2008 | Sankaran |
| 2009/0232408 A1* | 9/2009 | Meany .................. H03M 7/40 382/246 |
| 2011/0317929 A1 | 12/2011 | Takada |
| 2013/0182755 A1* | 7/2013 | Chen ..................... H04N 19/70 375/240.01 |
| 2014/0064365 A1 | 3/2014 | Wang et al. |

OTHER PUBLICATIONS

Hu et al., "Motion Differential Set Partition Coding for Image Sequence and Video Compression", J. Vis. Commun. Image R. 23 (2012), pp. 634-641.

William A. Pearlman: Wavelet Image Compression "Synthesis Lectures on Image, Vision, and Multimedia Processing", 2013, pp. 1-90.

Pearlman et al., "Set Partition Coding: Part 1 of Set Partition Coding and Image Wavelet Coding Systems, Foundations and Trends in Signal Processing", vol. 2, No. 2 (2008), pp. 95-180.

* cited by examiner

ERROR-RESILIENT CODER OF IMAGE SEQUENCES AND VIDEO

FIELD OF INVENTION

The present invention relates to an apparatus and method of efficient image sequence coding that encodes successive frames of an image sequence based on combining error resilient techniques to inhibit error propagation including dividing a source into independent coding units, and encoding with a progressive significance map for every coding unit.

BACKGROUND OF INVENTION

One of the drawbacks of SPIHT and variable length coders is their sensitivity to channel errors. The compressed bitstream SPIHT and other set partition coders (SPCs) divide naturally into two components: a significance map that conveys location information; and a value bitstream that conveys intensity information of signs and lower order bits of wavelet coefficients. A single bit error in the significance map can cause a catastrophe in image reconstruction due to error propagation. The earlier the error the worse is the degradation.

SUMMARY OF INVENTION

Shortcomings of the prior art are overcome and additional advantages are provided through the provision for encoding a sequence of frames as one or more compressed bitstreams, the method may include: obtaining, by a processor, a sequence of frames in an order; performing a wavelet transform on each frame of the sequence of frames independently in the order; constructing a significant points list and a list of insignificant sets and creating one or more spatial trees comprised of branch nodes of the list of insignificant sets for each frame of the sequence of frames and identifying a most significant bit in each frame; initializing the significant points list and the list of insignificant sets for each frame; for each frame, selecting at least one coding unit, wherein each coding unit represents a portion of a frame of the sequence of frames; creating, by the processor, a progressive significance map for coding unit by searching the one or more spatial trees, the progressive significance map comprising a sum part and a complementary part, wherein the sum part indicates numbers of significant sets emanating from certain of the branch nodes of each of the one or more spatial trees, and wherein the complementary part identifies location patterns of the significant sets emanating from certain of the branch nodes of each of the one or more spatial trees and writing the progressive significance map to the one or more compressed bitstreams; writing a global header for each of the one or more compressed bitstreams, wherein the global header comprises parameters of the sequence of frames; and writing a local header for the one or more compressed bitstreams for each coding unit of the sequence of frames, wherein the local header for each coding unit comprises indicators of sizes in bitstream segments for the coding unit, wherein the local header indicates transitions between frames in the sequence of frame and the order.

Additional features are realized through the techniques of the present invention, including but not limited to additionally: decoding, by the processor, the one or more compressed bitstreams to produce the sequence of frames in the order by referencing the local headers to indicate transitions between the frames and the order of the frames.

Computer systems, computer program products, and methods relating to one or more aspects of the technique are also described and may be claimed herein. Further, services relating to one or more aspects of the technique are also described and may be claimed herein. Additional features and advantages are realized through the techniques described herein. Other embodiments and aspects are described in detail herein and are considered a part of the claimed aspects.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
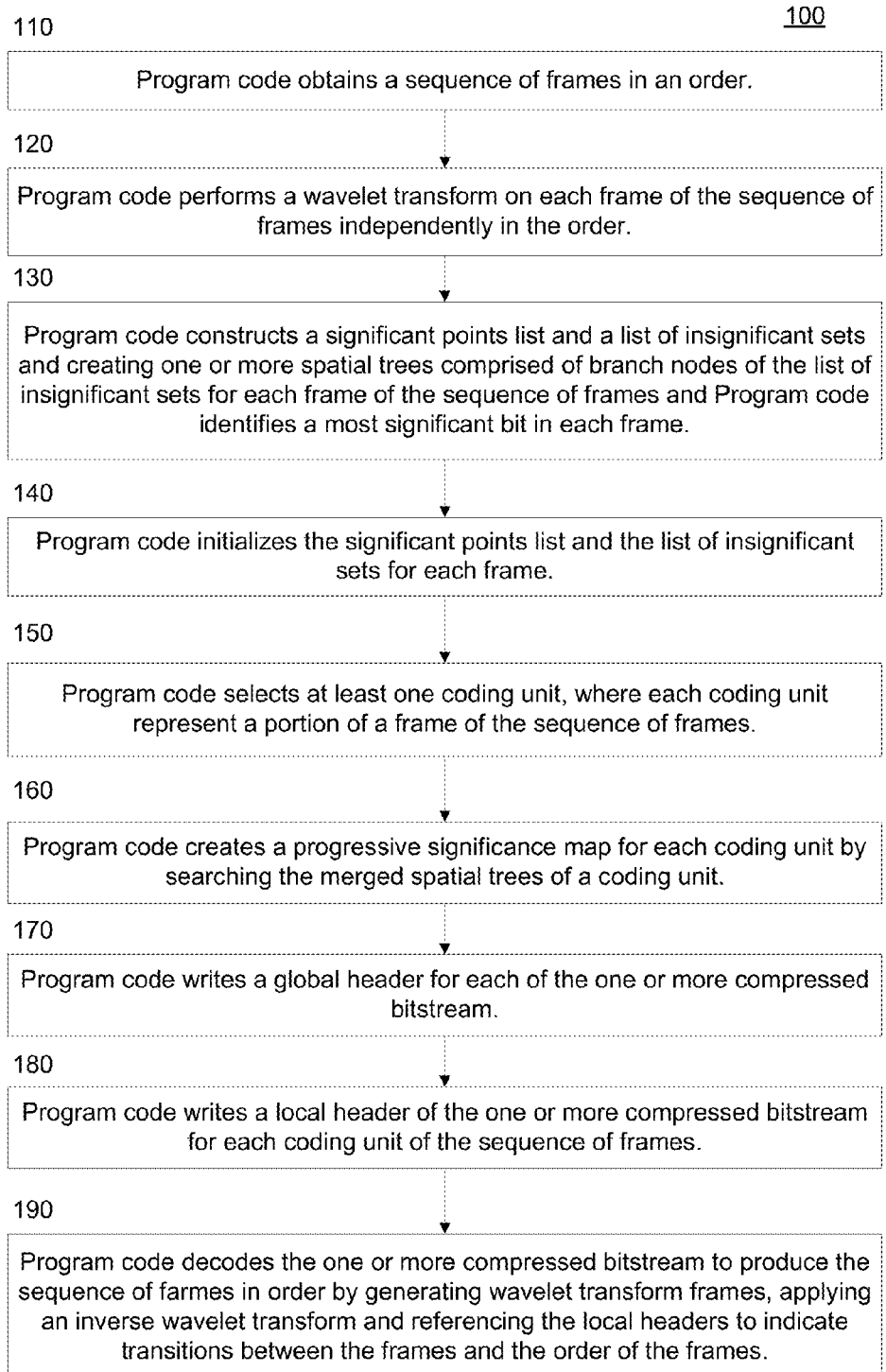
FIG. 1 depicts a workflow of several aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The computer system, method, and computer program product described herein address the problem of utilizing a set petitioner coder (SPC) for encoding sequences of images and/or video with an increased error resilience. Image sequences include, but are not limited to, video (gray and color), volume medical images, and hyperspectral images. Embodiments of the present invention include a codec with an encoder that writes a compressed bit stream (codestream)

and a decoder that decodes the codestream and reconstructs the frames of the video or other sequence of images.

Embodiments of the present invention may include program code to encode successive frames of an image sequence by dividing a source into independent coding units (i.e., dividing the wavelet transform into a number of groups that are encoded independently), so that reception bit errors cause damage only in the unit in which they occur. In these embodiments of the present invention, program code may encode a given sequence of frames as more than one compressed bitstream. In another embodiment of the present invention, rather than divide the source into these coding units the program code encodes each frame individually and sequentially and writes the data into a single compressed bitstream. Separating a source into groups (e.g., contiguous and dispersive) for encoding a three dimensional (3-D) image was described in the article S. Cho and W. A. Pearlman, "Multilayered Protection of Embedded Video Bitstreams over Binary Symmetric and Packet Erasure Channels," *J. Visual Communication and Image Representation*, Vol. 16, pp. 359-378, June 2005. However, the coding related to the coding units in this article relied on 3-D parts of a 3-D wavelet transform to create 3-D spatio-temporal trees, resulting in a more robust bitstreams representing 3-D entities. Embodiments of the present invention differ from the method described in this paper because embodiments of the present invention do not utilize 3-D components. Rather, embodiments of the present invention perform two dimensional (2-D) wavelet transform resulting in 2-D spatial trees and the encoding results in one or more bitstreams representing 2-D entities.

Embodiments of the present invention also include program code that encodes with a progressive significance map for every coding unit, where this coding unit can be a group or a single frame. Utilizing both these methods of error resilience together in every frame, with no interdependence between frames, program code in embodiments of the present invention codes and compresses image sequences in a manner that is efficient in compression and superior in error resilience. Additionally, an advantage of certain embodiments of the present invention is that a sequence of frames (or slices or spectral bands) is encoded such that the frames all have the same quality or distortion.

Embodiments of the present invention incorporate error-resilience techniques previously available only for single images or frames, into a coder of image sequences or video. For example, embodiments of the present invention utilize the functionality of single image ErrRes-SPIHT to resist errors, but include improvements to this method that enable it to be extended to function for sequences of images and video. An error-resilient single image coder using ErrRes-SPIHT that was featured in the journal paper Y. Hu, W. A. Pearlman, and X. Li, "Progressive significance map and its application to error resilient image transmission," *IEEE Trans. on Image Processing*, vol. 21, no. 7, pp. 3229-3238, 2012, which is incorporated herein in its entirety. However, in order to extend a still image coder, including but not limited to ErrRes-SPIHT, to an image sequence or a video, embodiments of the present invention include aspects that read and encode images sequentially and write them sequentially to the compressed bitstream, such that program code decoding the one or more compressed bitstream representing the sequence of images will decode the one or more compressed bitstreams in a manner that accurately reproduces the sequence of frames accurately and in the original order (i.e., before compression).

Embodiments of the present invention comprise SPC image sequence coders, including but not limited to, SPIHT image sequence coders with superior error resilience properties. Some embodiments of the present invention use one or more of contiguous or dispersive group coding that produces multiple bitstreams while some embodiments encode the individual frames but produce a single compressed bitstream from the sequence of frames. The program code may produce, for each coding unit, whether the coding unit comprises a frame or a group, a progressive significance map, which, in contrast to a traditional significance map, has a part which is represented by a fixed-length codeword portion in which bit errors do not propagate, in order to obtain a high resistance to channel bit errors. The advantages of this fixed-length portion are discussed in greater detail herein.

Aspects of the present invention can be applied to any SPC coder that generates a significance map, however, for illustrative purposes only, many examples provided utilize the SPIHT coding algorithm, but could have also used SPECK or SBHP, for example. The codestream structures of SPIHT and ErrRes-SPIHT both contain three categories of bits: significance map (or location) bits, sign bits, and refinement bits. The significance map contains the locations of all significant sets and pixels; the sign bits designate the signs of significant pixels; and the refinement bits are the lower order bits of significant pixels. When utilized by program code that decodes one or more compressed bitstreams to reproduce the previously encoded sequence of frames, the significance map describes, to the program code, the order of execution of the image compression. Thus, any bit error in the significance map will cause the decoder to lose synchronization with the encoder and to decode incorrectly after the point of the error. Bit errors in the sign and refinement bits do not propagate and cause only local errors. The progressive significance map of ErrRes-SPIHT is structured into two parts: an arithmetic coded part, called the sum map, that conveys the number of significant sets that descend from a tree node, including single and multiple pixel sets, and a fixed-length codeword part, called the complementary map, that conveys which of these sets are significant. The sum map, like the full significance map of SPIHT, is vulnerable to error propagation caused by channel errors. Errors in the complementary map cause only local impairment, so it remains uncoded. The length of the sum map is typically about 60% of that of the full significance map of that of SPIHT, so the full significance map of ErrRes-SPIHT is less vulnerable and thus more resistant to channel errors than a traditional SPIHT significance map. Embodiments of the present invention employ progressive significance maps that include the complementary map to inhibit propagation of errors in decoding.

Embodiments of the present invention extend aspects of the aforementioned ErrRes-SPIHT single image coder to a coder operable to code sequences of images and/or video by reading and encoding the images (e.g., frames) sequentially and writing them sequentially to the one or more compressed bitstream. In an embodiment of the present invention, program code writes a global header containing the original image parameters, such as width, height, bit depth, and, number and size of color planes if more than one. For each frame, the program code writes indicators of the sizes in bytes of the bitstream segments of the sum map, complementary map, sign map and refinement map. Program code comprising the decoder in the present invention utilizes these sizes to decode these segments separately within one frame and determine the start of the next frame to decode.

The program code writes these decoded frames sequentially to the output to form the reconstructed image sequence. In an embodiment of the present invention, in order to encode the frames in an image sequence or video such that they have the same quality or distortion, the program code codes every frame to the same minimal bit plane and writes the minimal bit plane number into the global header.

As understood by one of skill in the art, the term program code, as used throughout this specification, includes hardware, software, and both hardware and software. This program code can be executed by at least one processor and stored in a memory resource accessible to this resource that can be internal and/or external to a computer system that includes the one or more processors executing the program code.

FIG. 1 is a workflow 100 that illustrates certain aforementioned aspects of embodiments of the present invention. An embodiment of the present invention includes a method for encoding and decoding a sequence of frames, which, as illustrated in FIG. 1, includes encoding the sequence and decoding it. To this end, to encode a sequence of frames into one or more compressed bitstreams, program code obtains a sequence of frames in an order (110). Maintaining the order of the sequence of frames through compressing and decompressing (encoding and decoding) is a challenge when encoding sequences. To this end, upon receiving the sequence of frames, in an embodiment of the present invention, the program code performs a wavelet transform on each frame of the sequence of frames independently in the order (120). The program code constructs a significant points list and a list of insignificant sets and creates one or more spatial trees comprised of branch nodes of the list of insignificant sets for each frame of the sequence of frames and identifies a most significant bit in each frame (130). The program code initializes the significant points list and the list of insignificant sets for each frame (140).

Figure 2:
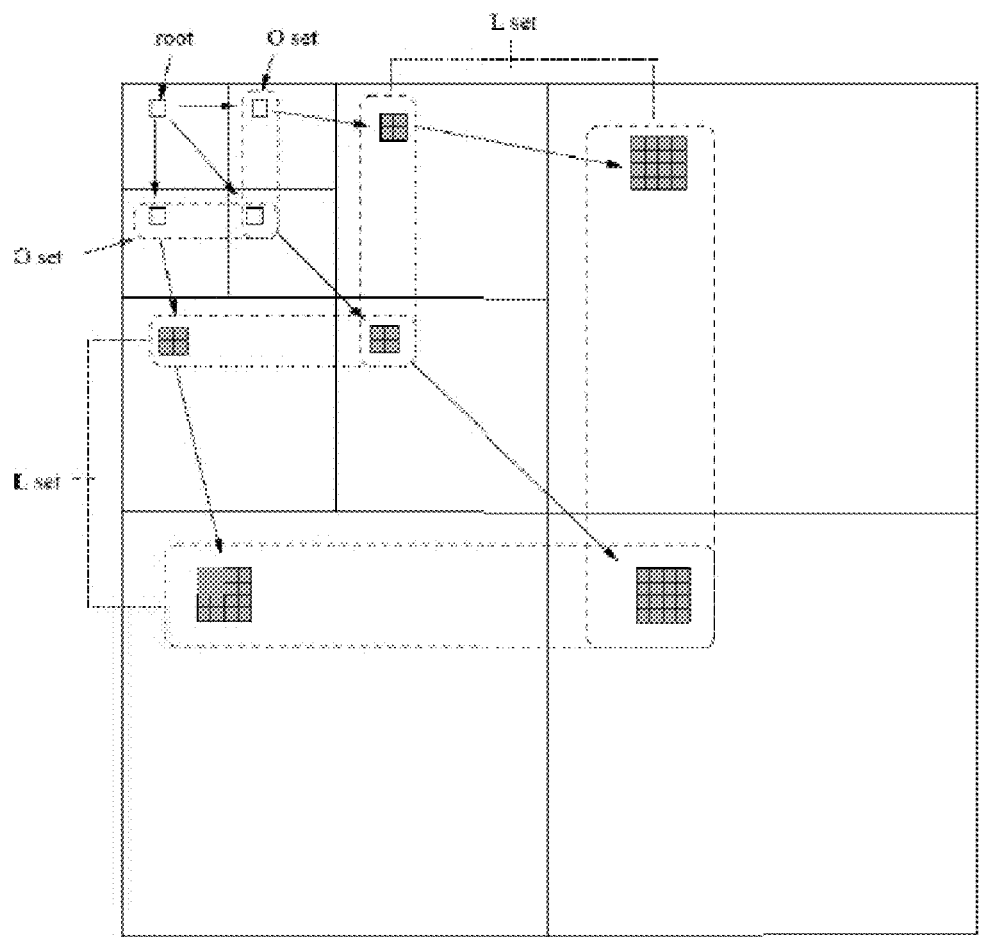
FIG. 2 depicts an example of how the program code creates an individual spatial tree.

FIG. 2 depicts an example of how the program code creates an individual spatial tree. For example, in an embodiment of the present invention, the program utilizes aspects of the SPIHT (as a non-limiting example of an SPC that can be utilized in an embodiment of the present invention) by creating a spatial orientation tree that defines the spatial relationship within the hierarchical subband pyramid. FIG. 2 shows how a spatial orientation tree is defined in a pyramid that is constructed with recursive branching to four offspring nodes when passing a significance test. Each node of the tree corresponds to a pixel, and is identified by the pixel coordinate. Its direct descendants (offspring) correspond to the pixels of the same spatial orientation in the next finer level of the pyramid. The tree is defined such that each node has either no offspring, i.e., leaves, or four offspring, which always form a group of 2×2 adjacent pixels. In FIG. 2, the arrows are oriented from each parent node to its four offspring. The pixels in the highest level of the pyramid are the tree roots and are also grouped in 2×2 adjacent pixels. However, their offspring branching rule is different, and one of them (indicated by the start—the upper left corner point in each group) has no descendants. Each of the other three in the group has a branching to a group of four in a subband of the same orientation in the same level. As understood by one of skill in the art, FIG. 2 is only one example of a method by which program code creates a significance map. For example, when utilizing SPECK (Set Partition Embedded bloCK), another SPC, the program code generates quadrature trees (quad trees, trees with branching factor of four) within each subband by means of recursive quadrature splitting of significant sets.

For each frame, the program code selects at least one coding unit, where each coding unit represents a portion of a frame of the sequence of frames (150). As aforementioned, in certain embodiments of the present invention, the program code may produce one or more compressed bitstreams when encoding a sequence of frames. In an embodiment of the present invention, the one or more bitstreams can be understood as sub-bitstreams that comprise the compressed bitstream for a given sequence of frames. The program code may designate coding units within the source (the sequence of frames) to encode into separate bitstreams. Each bitstream includes significance map (or location) bits, sign bits, and refinement bits, as will be discussed in reference to FIGS. 6A-6B, which will be discussed in greater detail hereafter.

In one embodiment of the present invention, the program code may write the encoded sequence of frames to a single bitstream, regarding each frame as a coding unit. In another embodiment of the present invention, the program code may designate coding units, where each coding unit is a portion of a frame, the program code produces multiple bit streams, one for each coding unit, that represent the sequence of frames. The designation of coding units for use to write multiple bitstreams is possible because, in an embodiment of the present invention, performing the wavelet transform includes calculating a spatial discrete wavelet transform for each frame and organizing the spatial discrete wavelet transforms of into subbands comprising contiguous groups of coefficients, wherein the coefficients represent different frequencies. In an embodiment of the present invention, a contiguous group of coefficients is a subband. To designate a coding unit, the program code divides a subband of the lowest frequency into groups, where each group comprises roots of spatial orientation trees, and each group of spatial orientation trees forms a coding unit.

Figure 3:
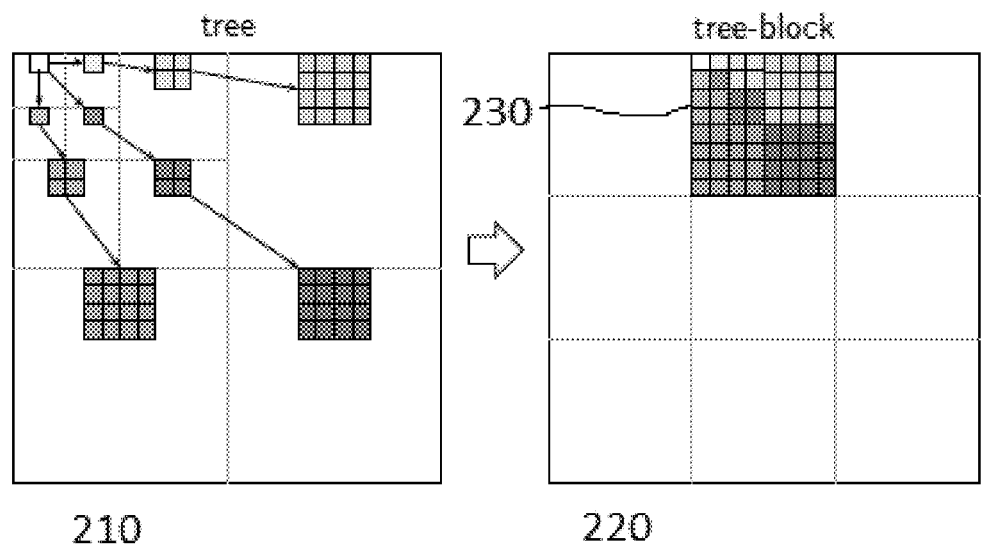
FIG. 3 is an example of a single spatial orientation trees in the wavelet transform domain, as utilized in an embodiment of the present invention.

Certain advantages in error resilience may be realized in embodiments of the present invention that produce multiple bitstreams (sub-bitstreams) over embodiments that produce a single compressed bitstream. As aforementioned in reference to FIG. 1, in an embodiment of the present invention, in one aspect, the program code encodes every frame independently because the program code performs a wavelet transform on each frame of the sequence of frames independently in the order (120). In an embodiment of the present invention, in performing this transform, program code may calculate a spatial discrete wavelet transform (DWT) for every image frame. The program code organizes the DWT of each frame into subbands (i.e., contiguous groups of coefficients) that are associated with distinct spatial frequency ranges. A DWT can be understood as a number of non-overlapping spatial orientation trees (SOTs). These trees are rooted in the lowest frequency (LL) subband and branch successively to higher frequency subbands at the same spatial orientation. FIG. 3 is an example of a single SOT in the wavelet transform domain. The SOT 210 represents the region of the image in the same relative position as its root in the lowest frequency subband. FIG. 3 also shows the rearrangement of the SOT 210 into a tree block 220 placed in the image region 230 it represents.

As aforementioned, embodiments of the present invention can include any SPC coding method, however, SPIHT is used in this example for illustrative purposes. The SPIHT algorithm generally operates on a differently configured SOT, shown in FIG. 4, where the 2×2 blocks in the lowest frequency (LL) subband are the seminal elements. The points in the block are roots of SOTs, except for the upper left point, which has no descendants.

Figure 4:
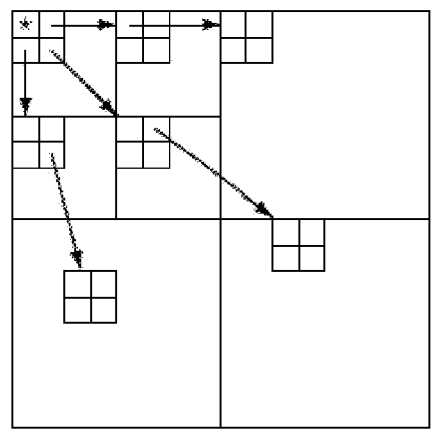
FIG. 4 depicts an alternate configuration for a spatial orientation tree, as utilized in an embodiment of the present invention.

FIGS. 2-4 illustrate how the program code can separate the source into coding units for use in producing the compressed sub-bitstreams and the advantages of this aspect. Referring to FIG. 3, the tree block is the merged SOTs of the 2×2 block and its upper left point, as seen in FIG. 4. The sets in SPIHT are offspring sets, which are direct descendants of the roots, and grand-descendant sets, which are descendants of the offspring. When utilizing SPIHT for image compression, in an embodiment of the present invention, the program code searches for the locations of significant sets. When it deems a set as significant (at a given threshold or bitplane level), it writes a "1" to the significance map; otherwise, it writes a "0". The program code utilizes this map to determine its execution path, so when received correctly at the decoder, the program code can correctly decode images.

In an embodiment of the present invention, the initial threshold corresponds to the top bitplane of the coefficient with highest magnitude. Thus, the program code searches for significance successively from the highest bitplane to some lower bitplane, depending on the target rate or distortion. The program code may utilize reversible (integer-to-integer) wavelet filters to achieve perfectly lossless decoding which is achievable when coding through the bottom bitplane of every frame. In an embodiment of the present invention, the bit rate may not be set for all frames because information content varies among the frames, so the same bit rate should not be set for all the frames. Setting the same bit rate would produce varying reconstruction qualities among the reconstructed bitstreams. Thus, instead, the program code may obtain a comparable visual quality for every frame by coding every frame through the same bitplane or through the same fraction of the same bitplane.

Figure 5:
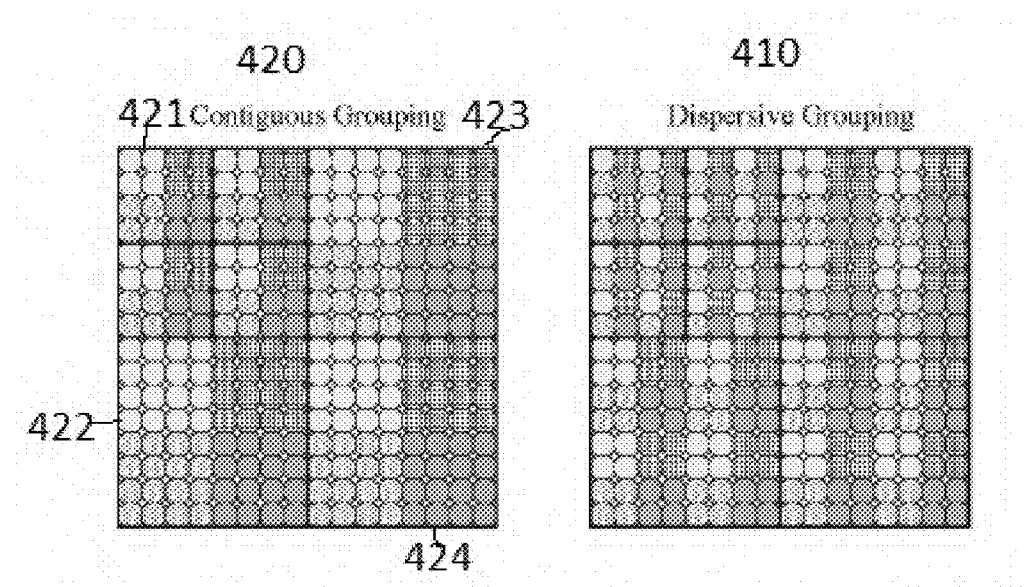
FIG. 5 depicts two types of formation groups, which are aspects of certain embodiments of the present invention.

In order to avoid producing a bitstream that includes a significance map in which a single bit error will cause catastrophic decoding error in the rest of the bitstream, the program code produces a number of independent sub-bitstreams, so that no error in a given sub-bitstream affects decoding in another sub-bitstream. The program code therefore divides the coefficients in the lowest frequency subband into a number of groups, denoted by S, where the merged SOT's of every group are encoded independently. S=1 indicates normal SPIHT, which encodes the LL subband as a single group. FIG. 5 is an example of formations of groups when S=4, i.e., the program code has divided the source into 4 independent coding units.

FIG. 5 shows two possible group formations for S=4 groups or sub-bitstreams in a 16×16 DWT. These formations are the number of groups are offered as a non-limiting example. The left-hand grouping 420 is comprises of groups formed from contiguous points, which can be single coefficients or 2×2 blocks, while the right-hand grouping 410 shows dispersive groups formed by gathering points at fixed intervals. The fixed intervals in the right hand dispersive grouping 410 are 2 in each direction and so is designated as a 2×2 grouping. As understood by one of skill in the art, additional groupings can also be utilized in embodiments of the present invention, including but not limited to, a 4×4 grouping, where the fixed intervals are 4 in each direction.

As can be observed in FIG. 5, if a bit error occurs early in the sub-bitstream belonging to the contiguous group 420, then the upper right quadrant 421 of the decoded image will show serious degradation. If the other three sub-bitstreams are received correctly, then the other three quadrants 422-424 of the decoded image will be reconstructed without error. However, suppose a bit error occurs early in the sub-bitstream belonging to the dispersive group 410 formed by the darker solid gray coefficients. The decoded image will show a 4×4 array of degraded pixels (or small square regions) in the same relative positions in the decode image as the same-colored coefficients in the lowest frequency subband.

In embodiments of the present invention, because the program code partitions wavelet transforms (e.g., 2-D wavelet transforms) into independently coded tree blocks the program code prevents error propagation between different block codestreams. As demonstrated in FIG. 5, by partitioning the coded tree blocks, the program code can conceal isolated errors by estimating the true values of their transform coefficients from their surrounding coefficients decoded from the sub-bitstreams of the other groups. This additional capability of error concealment makes the dispersive group formation very attractive for use in error-prone channel environments. In an embodiment of the present invention, the number of groups or sub-bitstreams S may depend on the dimensions of the lowest frequency subband, which in turn depends on the image dimensions and the number of wavelet decompositions. In some embodiments of the present invention, if an image has M rows and M columns, and the number of decompositions is D, then there are $M^2/2^{2D}$ coefficients in the lowest frequency subband. In this example, the largest fixed interval of $M/2^{2D}$ gives the maximum $S=M/2^{D+1}$. In some embodiments of the present invention, S=16 is utilized. Increasing the number of sub-bitstreams can increase the amount of overhead needed for the headers, given that each group has an individual header.

In embodiments of the present invention, by encoding a wavelet transform into independent and separate sub-bitstreams, the program code assures that transmission errors affect only the sub-bitstream in which they occur, which provides a level of error resilience. However, every significance map within a sub-bitstream is still vulnerable to catastrophic error propagation caused by a received bit error, which is addressed by producing and utilizing a progressive significance map.

Returning to FIG. 1, the program code creates a progressive significance map for each coding unit by searching the merged individual spatial trees of a coding unit (which can comprise one or more trees depending on the coding unit) (160). In an embodiment of the present invention, when the program code finds single points significant, the program code writes these points to a buffer. The program code executes a second pass to produce refinement bits. In an embodiment of the present invention, for each coding unit, the program code write a compressed bitstream that includes a significance map (i.e., a progressive significance map), sign bits, and refinement bits, which are the lower order bits of coefficients identified as significant.

In an embodiment of the present invention, the progressive significance map includes a sum part and a complementary part. The sum part indicates numbers of significant sets emanating from certain of the branch nodes of each individual spatial tree, and the complementary part identifies location patterns of the significant sets emanating from certain of the branch nodes of each individual spatial tree. A progressive significance map renders the encoded sequence more error resilient because a significant portion of a progressive significance map is not vulnerable to this catastrophic error because the program code writes a portion of progressive significance maps with fixed-length codewords that are not susceptible to this kind of error effect.

Figure 6A:
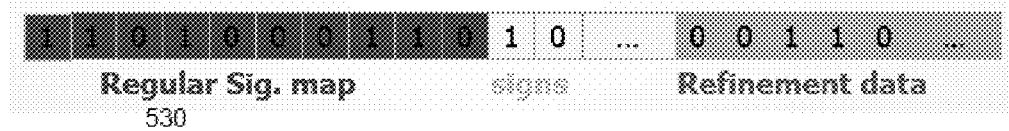
FIGS. 6A-6B illustrates a bitstream with a significance map and a bitstream with a progressive significance map, the latter, an aspect of some embodiments of the present invention.
Figure 6B:
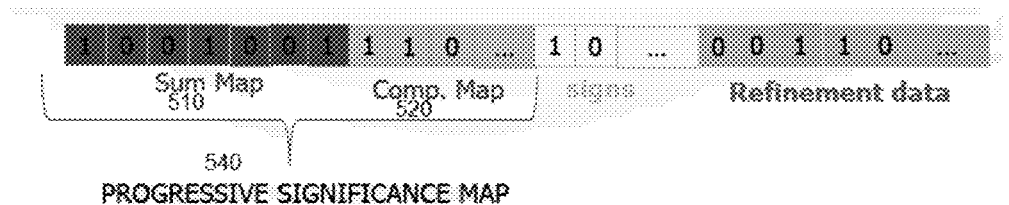

In an aspect of the present invention, a progressive significance map includes two segments: a sum map and a complementary map. FIG. 6A illustrates a bitstream with a significance map 530, while FIG. 6B depicts a bitstream with a progressive significance map 540. As seen in FIG. 6B, in the progressive significance map 540, a sum map 510 indicates the numbers of significant sets among the four emanating from the branch nodes in and SOT. The complementary map 520 indicates the location and patterns of those sets that are significant. Unlike the significance map 530 or the sum map 510, the complementary map 520 is written with fixed length codewords, so that bit errors cause only local damage in the decoded image. In an embodiment of the present invention, a complementary map 520 has a fixed-length code of 4-element significance patterns and a length that is approximately 40% of the length of a regular significance map.

Bit errors in the sum map 520 cause incorrect numbers of significant coefficients within the group, so these errors propagate. While a regular significance map 520 is susceptible to error propagation and, as is sum map 510, complementary map 520, which is part of a progressive significance map 540, can only suffer local data damage. Thus, a smaller portion of a progressive significance map 540 is vulnerable to error propagation than a significance map 530.

Returning to FIG. 1, in an embodiment of the present invention, the program code writes a global header for each of the one or more compressed bitstreams (170). The global header includes parameters of the sequence of frames. In an embodiment of the present invention, the parameters in the global header include, but are not limited to, original image (frame) parameters such as width, height, bit depth, and, number and size of color planes, if more than one, and a minimum threshold or bitplane. The program code also writes a local header of the one or more compressed bitstreams for each coding unit of the sequence of frames (180). A local header for each coding unit may include indicators of sizes in bitstream segments for the frame. Local headers are used to accommodate the multiple frames in a sequence (or video), and for each frame, the program code writes indicators, including but not limited to, sizes in bytes of the bitstream segments of the sum map, complementary map, sign map and refinement map.

Now that the sequence of frames had been encoded, it can be decoded. Returning to FIG. 1, the program code decodes the one or more compressed bitstreams to produce the sequence of frames in the order by referencing the local headers to indicate transitions between the frames and the order of the frames (190). The decompression process is an inversion of the compression process as the program code decodes the one or more compressed bitstreams to produce wavelet transforms of the sequence of frames and applies an inverse wavelet transform to decode the sequence of frames.

Thus, the program code may write these decoded frames sequentially to the output to form the reconstructed image sequence.

The present invention may be a system, a method, and/or a computer program product.

Figure 7:
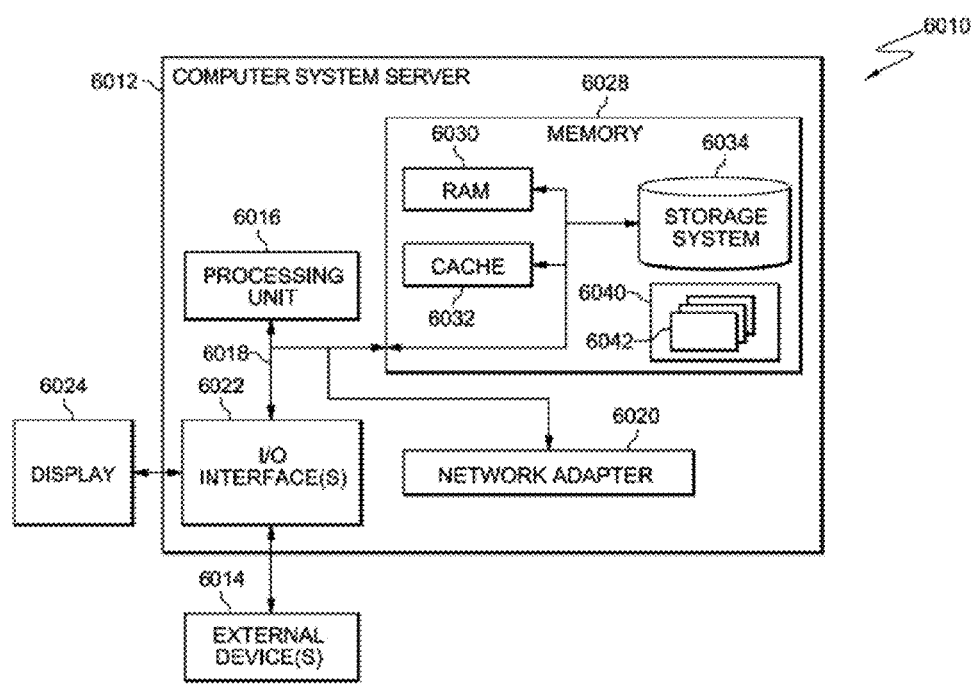
FIG. 7 depicts an embodiment of a computing node that may be utilized in an embodiment of the present invention.

As understood by one of skill in the art, aspects of the present invention can be implemented on one or more nodes of a computing system, which can optionally include one or more nodes of a cloud computing environment. FIG. 7 depicts an embodiment of a computing node that may include a server or other computing resource in a system into which aspects of the present invention are implemented. Referring now to FIG. 7, a schematic of an example of a computing node is shown. Computing node 6010 is only one example of a suitable computing node and is not intended to suggest any limitation as to the scope of use or functionality of embodiments of the invention described herein. Regardless, computing node 6010 is capable of being implemented and/or performing any of the functionality set forth hereinabove.

In computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions (referred to also as program code), such as program modules, being executed by a computer system. Generally, program modules may include routines, programs, objects, components, logic, data structures, and so on that perform particular tasks or implement particular abstract data types. Computer system/server 6012 may be practiced in distributed computing environments where tasks are performed by remote processing devices that are linked through a communications network. In a distributed environment, program modules may be located in both local and remote computer system storage media including memory storage devices.

As shown in FIG. 7, computer system/server 6012 in computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 8:
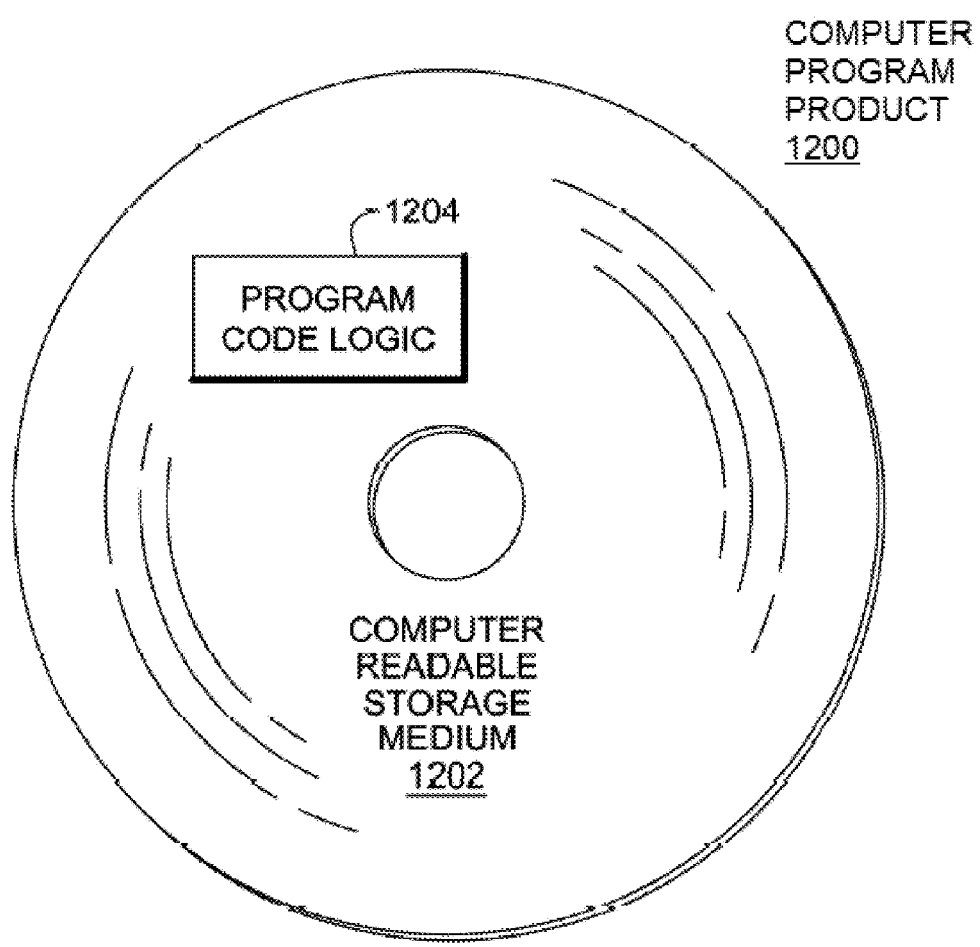
FIG. 8 depicts a computer program product that may be utilized in an embodiment of the present invention.

The computer program product may include a computer readable storage medium (or media) having computer readable program instructions thereon for causing a processor to carry out aspects of the present invention. Referring to FIG. 8, in one example, a computer program product 1200 includes, for instance, one or more non-transitory computer readable storage media 1202 to store computer readable program code means, logic and/or instructions 1204 thereon to provide and facilitate one or more embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Although various embodiments are described above, these are only examples. For example, computing environments of other architectures can be used to incorporate and use one or more embodiments. Further, different instructions, instruction formats, instruction fields and/or instruction values may be used. Yet further, although examples of values for abort codes and condition codes are provided, other values may be used. Moreover, different, other, and/or additional restrictions/constraints may be provided/used. Yet further, other intervals may be provided and/or used in differing ways. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The invention claimed is:

1. A method for encoding a sequence of frames as one or more compressed bitstreams, the method comprising:
  obtaining, by a processor, a sequence of frames in an order;
  performing a wavelet transform on each frame of the sequence of frames independently in the order, wherein performing a wavelet transform comprises calculating a spatial discrete wavelet transform for each frame and organizing the spatial discrete wavelet transforms into subbands comprising contiguous groups of coefficients, wherein the coefficients represent difference frequencies;
  constructing a significant points list and a list of insignificant sets for each frame of the sequence of frames and identifying a most significant bit in each frame;
  initializing the significant points list and the list of insignificant sets for each frame;
  for each frame, designating a coding unit, wherein each coding unit consists of a frame of the sequence of frames;
  creating, by the processor, a progressive significance map for the coding unit, the progressive significance map comprising a sum part and a complementary part, wherein the sum part indicates numbers of significant sets, and wherein the complementary part identifies location patterns of the significant sets and writing the progressive significance map to the one or more compressed bitstreams;
  writing a global header for each of the one or more compressed bitstreams, wherein the global header comprises parameters of the sequence of frames and the parameters are common to each frame of the sequence of frames, the parameters comprising a common minimal bitplane, to encode each frame through the common minimal bitplane;
  writing a local header for the one or more compressed bitstreams for each coding unit of the sequence of frames, wherein the local header for each coding unit comprises indicators of sizes in bitstream segments for the coding unit, wherein the local header indicates transitions between frames in the sequence of frames, wherein the local header indicates the order, and wherein the local header comprises a maximum bitplane; and
  decoding, by the processor, the one or more compressed bitstreams to produce the sequence of frames in the order by referencing the local headers to indicate transitions between the frames and the order of the frames and by referencing the global header so that each frame in the decoded sequence of frames has an equivalent quality or distortion, the decoding comprising decoding from the maximum bitplane to the minimum bitplane.

2. The method of claim 1, wherein the one or more compressed bitstreams comprise a bitstream for each coding unit.

3. The method of claim 1, wherein a coding unit comprises a frame and the one or more compressed bitstreams comprises one compressed bitstream.

4. The method of claim 1, wherein the complementary part comprises a fixed-length codeword.

5. The method of claim 1, wherein the one or more compressed bitstreams further comprise: sign bits and refinement bits.

6. The method of claim 1, the parameters in the global header further comprising: width, height, and bit depth.

7. A computer system for encoding a sequence of frames as one or more compressed bitstreams, the computer system comprising:
  a memory; and
  a processor in communications with the memory, wherein the computer system is configured to perform a method, the method comprising:
    obtaining, by a processor, a sequence of frames in an order;
    performing a wavelet transform on each frame of the sequence of frames independently in the order, wherein performing a wavelet transform comprises calculating a spatial discrete wavelet transform for each frame and organizing the spatial discrete wavelet transforms into subbands comprising contiguous groups of coefficients, wherein the coefficients represent difference frequencies;
    constructing a significant points list and a list of insignificant sets for each frame of the sequence of frames and identifying a most significant bit in each frame;
    initializing the significant points list and the list of insignificant sets for each frame;
    for each frame, designating a coding unit, wherein each coding unit consists of a frame of the sequence of frames;
    creating, by the processor, a progressive significance map for the coding unit, the progressive significance map comprising a sum part and a complementary part, wherein the sum part indicates numbers of significant sets, and wherein the complementary part identifies location patterns of the significant sets and writing the progressive significance map to the one or more compressed bitstreams;
    writing a global header for each of the one or more compressed bitstreams, wherein the global header comprises parameters of the sequence of frames and the parameters are common to each frame of the sequence of frames, the parameters comprising a common minimal bitplane, to encode each frame through the common minimal bitplane;
    writing a local header for the one or more compressed bitstreams for each coding unit of the sequence of frames, wherein the local header for each coding unit comprises indicators of sizes in bitstream segments for the coding unit, wherein the local header indicates transitions between frames in the sequence of frames, wherein the local header indicates the order, and wherein the local header comprises a maximum bitplane; and
    decoding, by the processor, the one or more compressed bitstreams to produce the sequence of frames in the order by referencing the local headers to indicate transitions between the frames and the order of the frames and by referencing the global header so that each frame in the decoded sequence of frames has an equivalent quality or distortion, the decoding comprising decoding from the maximum bitplane to the minimum bitplane.

8. The computer system of claim 7, wherein the one or more compressed bitstreams comprise a bitstream for each coding unit.

9. The computer system of claim 7, wherein a coding unit comprises a frame and the one or more compressed bitstreams comprises one compressed bitstream.

10. The computer system of claim 7, wherein the complementary part comprises a fixed-length codeword.

11. The computer system of claim 7, wherein the one or more compressed bitstreams further comprise: sign bits and refinement bits.

12. The computer system of claim 7, wherein the parameters in the global header further comprise: width, height, and bit depth.

13. A computer program product for encoding a sequence of color frames, the computer program product comprising:
a computer readable storage medium readable by a processing circuit and storing instructions for execution by the processing circuit for performing a method comprising:
a memory; and
a processor in communications with the memory, wherein the computer system is configured to perform a method, the method comprising:
obtaining, by a processor, a sequence of frames in an order;
performing a wavelet transform on each frame of the sequence of frames independently in the order, wherein performing a wavelet transform comprises calculating a spatial discrete wavelet transform for each frame and organizing the spatial discrete wavelet transforms into subbands comprising contiguous groups of coefficients, wherein the coefficients represent difference frequencies;
constructing a significant points list and a list of insignificant sets for each frame of the sequence of frames and identifying a most significant bit in each frame;
initializing the significant points list and the list of insignificant sets for each frame;
for each frame, designating a coding unit, wherein each coding unit consists of a frame of the sequence of frames;
creating, by the processor, a progressive significance map for the coding unit, the progressive significance map comprising a sum part and a complementary part, wherein the sum part indicates numbers of significant sets, and wherein the complementary part identifies location patterns of the significant sets and writing the progressive significance map to the one or more compressed bitstreams;
writing a global header for each of the one or more compressed bitstreams, wherein the global header comprises parameters of the sequence of frames and the parameters are common to each frame of the sequence of frames, the parameters comprising a common minimal bitplane, to encode each frame through the common minimal bitplane;
writing a local header for the one or more compressed bitstreams for each coding unit of the sequence of frames, wherein the local header for each coding unit comprises indicators of sizes in bitstream segments for the coding unit, wherein the local header indicates transitions between frames in the sequence of frames, wherein the local header indicates the order, and wherein the local header comprises a maximum bitplane; and
decoding, by the processor, the one or more compressed bitstreams to produce the sequence of frames in the order by referencing the local headers to indicate transitions between the frames and the order of the frames and by referencing the global header so that each frame in the decoded sequence of frames has an equivalent quality or distortion, the decoding comprising decoding from the maximum bitplane to the minimum bitplane.

* * * * *

UNITED STATES PATENT AND TRADEMARK OFFICE
CERTIFICATE OF CORRECTION

PATENT NO. : 10,003,822 B2  
APPLICATION NO. : 15/040554  
DATED : June 19, 2018  
INVENTOR(S) : Pearlman et al.

Page 1 of 1

It is certified that error appears in the above-identified patent and that said Letters Patent is hereby corrected as shown below:

In the Specification

Column 2, Line 62: Delete "petitioner" and insert -- partition --

Column 4, Line 58: Delete "bitstream" and insert -- bitstreams --

Column 7, Line 50: Delete "is comprises" and insert -- comprises --

In the Claims

Column 13, Line 28: Claim 1, Delete "difference frequencies;" and insert -- amplitudes of different frequencies; --

Column 14, Line 33: Claim 7, Delete "difference frequencies;" and insert -- amplitudes of different frequencies; --

Column 15, Line 30: Claim 13, Delete "communications" and insert -- communication --

Column 15, Line 42: Claim 13, Delete "difference frequencies;" and insert -- amplitudes of different frequencies; --

Signed and Sealed this  
Twenty-third Day of October, 2018

Andrei Iancu  
*Director of the United States Patent and Trademark Office*